US012053966B2

(12) United States Patent
Burdette et al.

(10) Patent No.: US 12,053,966 B2
(45) Date of Patent: Aug. 6, 2024

(54) GLASS ARTICLE INCLUDING FLEXIBLE MID-FRAME FOR JOINING A BENT GLASS SHEET TO A RIGID FRAME

(71) Applicant: CORNING INCORPORATED, Corning, NY (US)

(72) Inventors: Steven Roy Burdette, Big Flats, NY (US); Gaurav Dave, Painted Post, NY (US); Rohan Ram Galgalikar, Painted Post, NY (US); Khaled Layouni, Fontainebleau (FR); Kimberly Wilbert Smith, Hammondsport, NY (US); Christopher Lee Timmons, Big Flats, NY (US); Wei Xu, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 369 days.

(21) Appl. No.: 17/637,571

(22) PCT Filed: Jul. 12, 2021

(86) PCT No.: PCT/US2021/041265
§ 371 (c)(1),
(2) Date: Feb. 23, 2022

(87) PCT Pub. No.: WO2022/020124
PCT Pub. Date: Jan. 27, 2022

(65) Prior Publication Data
US 2022/0274368 A1    Sep. 1, 2022

Related U.S. Application Data

(60) Provisional application No. 63/055,648, filed on Jul. 23, 2020.

(51) Int. Cl.
*B32B 3/06*    (2006.01)
*B32B 1/00*    (2006.01)
(Continued)

(52) U.S. Cl.
CPC .................. *B32B 3/06* (2013.01); *B32B 1/00* (2013.01); *B32B 5/02* (2013.01); *B32B 7/08* (2013.01);
(Continued)

(58) Field of Classification Search
CPC .... B32B 3/06; B32B 7/00; B32B 7/04; B32B 7/08; B32B 17/10
See application file for complete search history.

(56) References Cited

U.S. PATENT DOCUMENTS 8,619,021 B2    12/2013    Hayton
9,582,098 B2    2/2017    Rosenberg et al.
(Continued)

FOREIGN PATENT DOCUMENTS

JP    2013-188993 A    9/2013
WO    2018/129065 A2    7/2018
(Continued)

OTHER PUBLICATIONS

"Standard Test Method for Measurement of Glass Stress-Optical Coefficient", In ASTM standard C770-98, 2013.
(Continued)

*Primary Examiner* — Zachary M Davis
(74) *Attorney, Agent, or Firm* — William M. Johnson; Payal A. Patel

(57) ABSTRACT

Disclosed is a method of forming a glass article. In the method, a mid-frame is adhered to a glass sheet in a flat configuration. The glass sheet has a first major surface and a second major surface opposite to the first major surface. The mid-frame is adhered to the second major surface of the
(Continued)

glass sheet. The glass sheet and mid-frame are bent over a forming surface of a chuck so that the glass sheet is in a curved configuration. The forming surface includes a first radius of curvature of 20 mm or more, and the first major surface of the glass sheet conforms to the forming surface. A frame is attached to the mid-frame, and the frame holds the glass sheet in the curved configuration.

20 Claims, 8 Drawing Sheets

(51) Int. Cl.
  *B32B 5/02* (2006.01)
  *B32B 7/08* (2019.01)
  *B32B 7/12* (2006.01)
  *B32B 17/06* (2006.01)
  *B32B 17/10* (2006.01)
  *B32B 27/30* (2006.01)
  *B32B 27/32* (2006.01)
  *B32B 27/34* (2006.01)
  *B32B 27/36* (2006.01)
  *B32B 27/40* (2006.01)
  *C03B 23/023* (2006.01)

(52) U.S. Cl.
  CPC .............. *B32B 7/12* (2013.01); *B32B 17/067* (2013.01); *B32B 17/10* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *C03B 23/023* (2013.01); *B32B 2260/021* (2013.01); *B32B 2260/046* (2013.01); *B32B 2307/732* (2013.01); *B32B 2457/20* (2013.01)

(56) References Cited

U.S. PATENT DOCUMENTS

| | | |
|---|---|---|
| 10,288,973 B1 | 5/2019 | Gupta et al. |
| 11,006,533 B2 | 5/2021 | Floch et al. |
| 2015/0258750 A1 | 9/2015 | Kang et al. |
| 2018/0188869 A1* | 7/2018 | Boggs .................... B32B 7/12 |
| 2018/0314368 A1 | 11/2018 | Isaacson et al. |
| 2018/0373913 A1 | 12/2018 | Panchawagh et al. |
| 2019/0247124 A1 | 8/2019 | Sankaran et al. |
| 2020/0062632 A1 | 2/2020 | Brennan et al. |
| 2020/0399161 A1 | 12/2020 | Kumar et al. |
| 2021/0188685 A1 | 6/2021 | Gahagan et al. |

FOREIGN PATENT DOCUMENTS

| | | |
|---|---|---|
| WO | 2020/106413 A1 | 5/2020 |
| WO | 2020/106471 A1 | 5/2020 |
| WO | 2020/112435 A1 | 6/2020 |

OTHER PUBLICATIONS

International Search Report and Written Opinion of the International Searching Authority; PCT/US2021/041265; dated Oct. 6, 2021; 12 pages; European Patent Office.

* cited by examiner

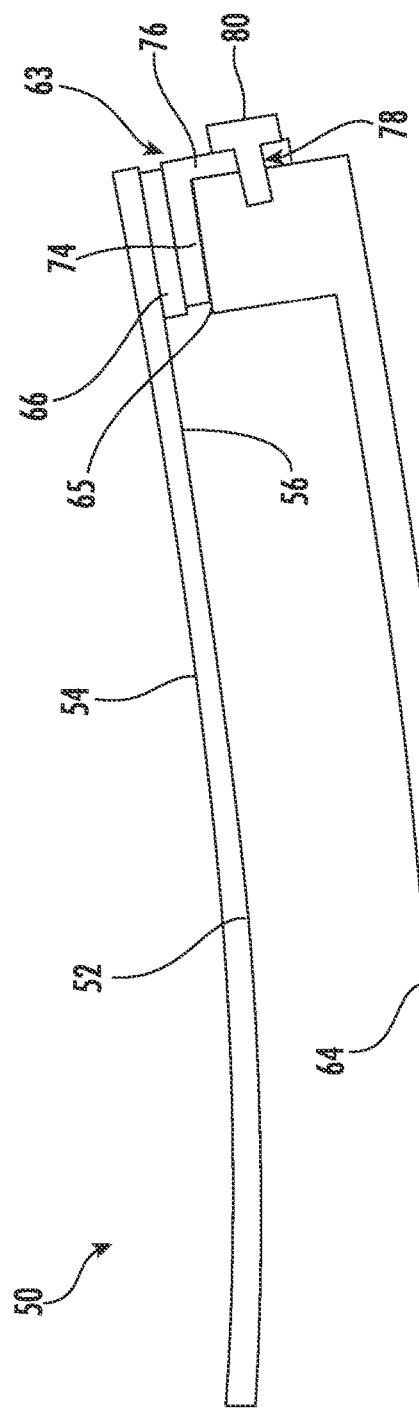
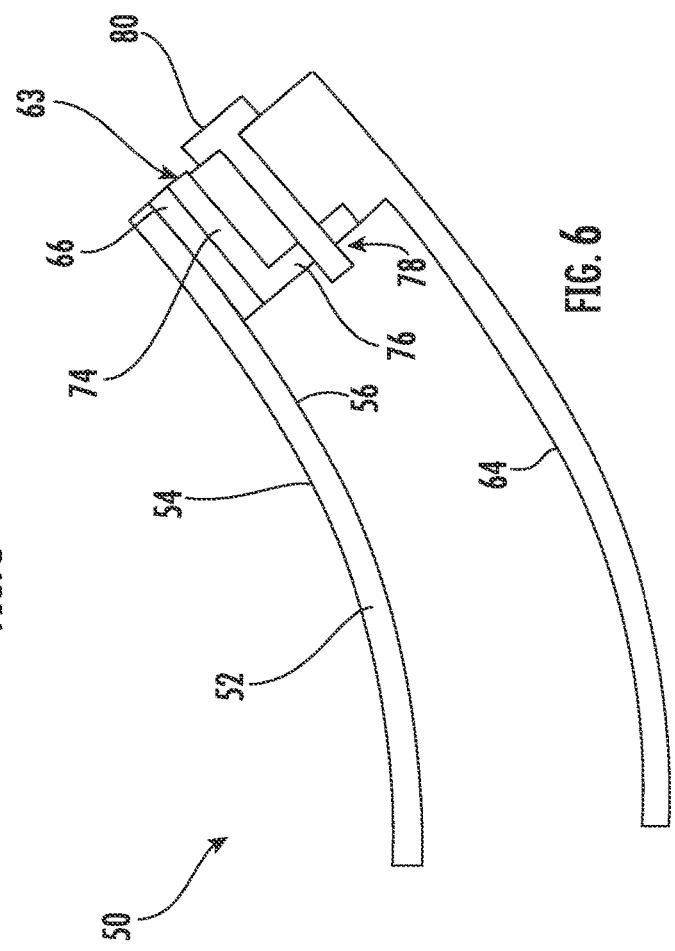

GLASS ARTICLE INCLUDING FLEXIBLE MID-FRAME FOR JOINING A BENT GLASS SHEET TO A RIGID FRAME

CROSS-REFERENCE TO RELATED APPLICATIONS

This application claims the benefit of priority under 35 U.S.C. § 371 of International Application No. PCT/US2021/041265, filed on Jul. 12, 2021, which claims the benefit of priority under 35 U.S.C. § 119 of U.S. Provisional Application Ser. No. 63/055,648 filed on Jul. 23, 2020, the content of each of which is relied upon and incorporated herein by reference in its entirety.

BACKGROUND

The disclosure relates to a curved glass article and, more particularly, to a curved glass article having a mid-frame and a method of forming same.

Vehicle interiors include curved surfaces and can incorporate displays in such curved surfaces. The materials used to form such curved surfaces are typically limited to polymers, which do not exhibit the durability and optical performance as glass. As such, curved glass sheets are desirable, especially when used as covers for displays. Existing methods of forming such curved glass sheets, such as thermal forming, have drawbacks including high cost, optical distortion, and surface marking. Additionally, to meet manufacturing demands, several forming apparatuses are needed for each processing line, and because of the number of forming apparatuses needed, the forming apparatuses are preferably relatively inexpensive to manufacture and use. Accordingly, Applicant has identified a need for vehicle interior systems that can incorporate a curved glass sheet in a cost-effective manner and without problems typically associated with glass thermal forming processes.

SUMMARY

According to an aspect, embodiments of the disclosure relate to a method of forming a glass article. In the method, a mid-frame is adhered to a glass sheet in a flat configuration. The glass sheet has a first major surface and a second major surface opposite to the first major surface. The mid-frame is adhered to the second major surface of the glass sheet. The glass sheet and mid-frame are bent over a forming surface of a chuck so that the glass sheet is in a curved configuration. The forming surface includes a first radius of curvature of 20 mm or more, and the first major surface of the glass sheet conforms to the forming surface. A frame is attached to the mid-frame, and the frame holds the glass sheet in the curved configuration.

According to another aspect, embodiments of the disclosure relate to a curved glass article. The curved glass article includes a glass sheet having a first major surface and a second major surface opposite to the first major surface. The glass article also includes a mid-frame adhered to the second major surface of the glass sheet. The mid-frame has a first stiffness. The glass article further includes a frame mechanically attached to the mid-frame. The frame has a second stiffness. The frame includes a frame support surface defining a curvature having a radius of curvature of 20 mm or more. The frame holds the glass sheet in a curved configuration, and the second stiffness is greater than the first stiffness.

According to still another aspect, embodiments of the disclosure relate to a mid-frame of a curved glass article. The curved glass article includes a glass sheet and a frame. The mid-frame includes a first member configured to be adhered to the glass sheet and a second member extending from the first member. The second member is configured for mechanical attachment to the frame.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 5-8 depict embodiments of a mid-frame for securing the frame to the curved glass article, according to an exemplary embodiment.

DETAILED DESCRIPTION

Figure 1:
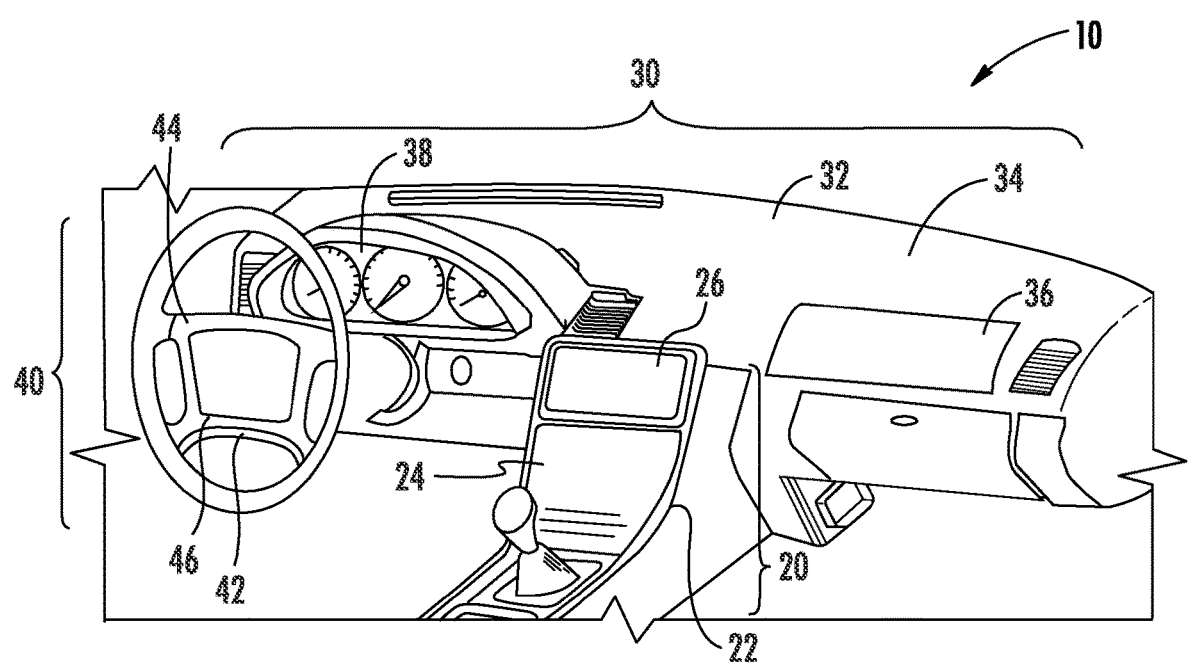
FIG. 1 is a perspective view of a vehicle interior with vehicle interior systems, according to exemplary embodiments.

Reference will now be made in detail to various embodiments, examples of which are illustrated in the accompanying drawings. In general, the present disclosure is directed to a curved glass article that includes a flexible mid-frame for mechanically connecting a glass sheet to a rigid, structural frame. As will be described herein, the mid-frame is a flexible frame that can be adhered to the glass sheet in large batches while the glass sheet is in a flat configuration. Then, each glass sheet and flexible mid-frame can be cold-bent together on a process chuck, and the rigid frame can be relatively quickly attached to the mid-frame to hold the glass sheet in the cold-bent configuration while on process chuck.

In certain conventional glass articles, the rigid frame is adhered directly to the glass sheet while the glass sheet is cold-bent on the process chuck. However, this requires the rigid frame and glass sheet to remain on the processing chuck for an extended period of time (e.g., up to two hours) while the adhesive bonding the rigid frame to the glass sheet cures. Because the number of processing chucks is limited, this creates a process bottleneck. That is, the number of glass articles that could be processed is limited by the availability forming chucks over which the glass sheet is bent. Further, a forming chuck may be specific to a single glass article design, and thus, the process bottleneck is multiplied depending on the number of glass article designs being manufactured. That is, only a certain number of forming chucks of each type can be devoted to cold-forming for a given manufacturing space and to maintain a cost-effective manufacturing process.

Because no specialized equipment, such as a curved processing chuck, is necessary to adhere the mid-frame to the glass sheet in the flat configuration, there is no processing bottleneck created during curing of the adhesive. Further, because the rigid frame is mechanically attached to the mid-frame to hold the glass sheet in the curved configuration, the time spent on the processing chuck is greatly reduced compared to the time that was previously spent on the processing chuck to allow the adhesive joining the rigid frame to the glass to cure. As such, the throughput per processing chuck can be increased and/or the total number of processing chucks required for a given throughput is decreased. Additionally, the mid-frame can be configured to alleviate thermal stresses that arise as a result of the different rates of thermal expansion/contraction between the rigid frame and glass sheet. These and other aspects and advantages will be described in relation to the embodiments provided below and in the drawings. These embodiments are presented by way of example and not by way of limitation.

In order to provide context for the glass article and the process of forming the glass article described herein, exemplary embodiments of curved glass articles will be described in relation to the particular application of a vehicle interior system.

FIG. 1 shows an exemplary interior 10 of a vehicle that includes three different embodiments of vehicle interior systems 20, 30, 40. Vehicle interior system 20 includes a base, shown as center console base 22, with a curved surface 24 including a display 26. Vehicle interior system 30 includes a base, shown as dashboard base 32, with a curved surface 34 including a display 36. The dashboard base 32 typically includes an instrument panel 38 which may also include a display. Vehicle interior system 40 includes a base, shown as steering wheel base 42, with a curved surface 44 and a display 46. In one or more embodiments, the vehicle interior system includes a base that is an arm rest, a pillar, a seat back, a floor board, a headrest, a door panel, or any portion of the interior of a vehicle that includes a curved surface.

The embodiments of the curved glass articles described herein can be used in each of vehicle interior systems 20, 30, 40, among others. In some such embodiments, the glass article discussed herein may include a cover glass sheet that also covers non-display surfaces of the dashboard, center console, steering wheel, door panel, etc. In such embodiments, the glass material may be selected based on its weight, aesthetic appearance, etc. and may be provided with a coating (e.g., an ink or pigment coating) including a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront or color matching functionality when the display 26, 36, 38, 46 is inactive. Further, while the vehicle interior of FIG. 1 depicts a vehicle in the form of an automobile (e.g., cars, trucks, buses and the like), the glass articles disclosed herein can be incorporated into other vehicles, such as trains, sea craft (boats, ships, submarines, and the like), and aircraft (e.g., drones, airplanes, jets, helicopters and the like).

Figure 2A:
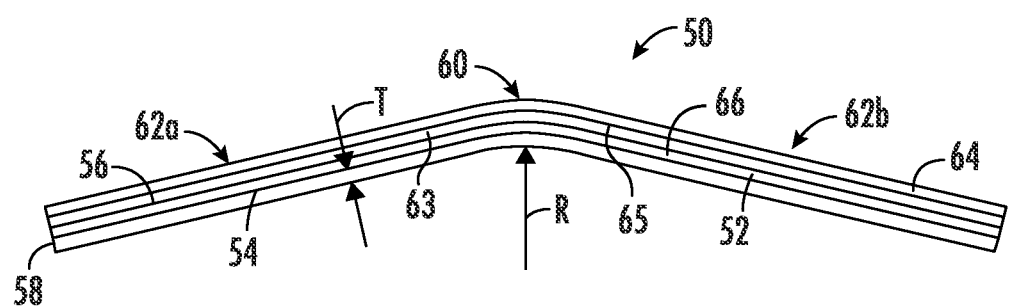
FIGS. 2A and 2B depict a V-shaped and a C-shaped curved glass article, respectively according to an exemplary embodiment.
Figure 2B:
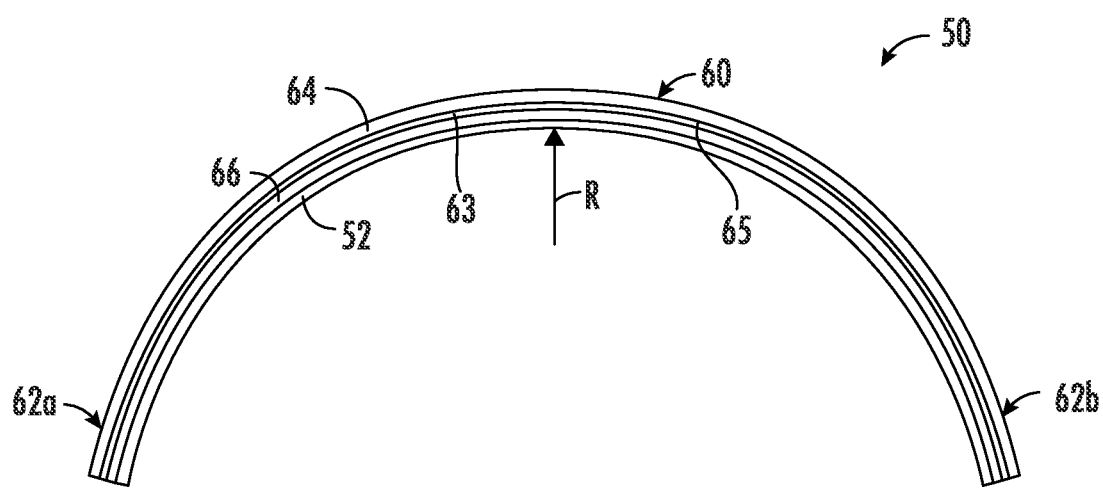

In embodiments, the curved surfaces 24, 34, 44 can be any of a variety of curved shapes, such as V-shaped or C-shaped as shown in FIGS. 2A and 2B, respectively. Referring first to FIG. 2A, a side view of an embodiment of a V-shaped glass article 50 is shown. The glass article 50 includes a glass sheet 52 having a first major surface 54, a second major surface 56 opposite to the first major surface 54, and a minor surface 58 joining the first major surface 54 to the second major surface 56. The first major surface 54 and the second major surface 56 define a thickness T of the glass sheet 52. In embodiments, the thickness T of the glass sheet 52 is from 0.3 mm to 2 mm, in particular 0.5 mm to 1.1 mm. In a vehicle, the first major surface 54 faces the occupants of the vehicle.

In embodiments, the first major surface 54 and/or the second major surface 56 includes one or more surface treatments. Examples of surface treatments that may be applied to one or both of the first major surface 54 and second major surface 56 include an anti-glare coating, an anti-reflective coating, a coating providing touch functionality, a decorative (e.g., ink or pigment) coating, and an easy-to-clean coating.

As can be seen in FIG. 2A, the glass sheet 52 has a curved region 60 disposed between a first flat section 62a and a second flat section 62b. In embodiments, the curved region 60 has a radius of curvature R that is from 50 mm to a radius of curvature that is less than substantially flat or planar (e.g., R=10 m). Further, as shown in FIG. 2A, the curved region 60 defines a concave curve with respect to the first major surface 54, but in other embodiments, the curved region 60 is instead a convex curve with respect to the first major surface 54.

In the glass article 50 of FIG. 2A, a mid-frame 63 is adhered to the second major surface 56 of the glass sheet 52. As mentioned above, the mid-frame 63 is configured for attachment of rigid, structural frame 64. In this way, the mid-frame 63 can be considered an interface between the glass sheet 52 and the rigid frame 64. The mid-frame 63 is attached to the glass sheet 52 via an adhesive layer 66, and the frame 64 is attached to the mid-frame 63 using a mechanical connection as will be discussed below. In embodiments, the adhesive layer 66 joining the mid-frame 63 to the glass sheet 52 is a structural adhesive, such toughened epoxy, flexible epoxy, acrylics, silicones, urethanes, polyurethanes, and silane modified polymers. In embodiments, the adhesive layer 66 has a thickness of 2 mm or less between the frame 64 and the glass sheet 52.

In part, the frame 64 facilitates mounting the glass article 50 to a vehicle interior base (such as center console base 22, dashboard base 32, and/or steering wheel base 42 as shown in FIG. 1). Additionally, the frame 64 has a curved frame support surface 65 that holds the glass sheet 52 in its curved shape (at least in the curved region 60). In embodiments, the glass sheet 52 is formed in such a way that the curved region 60 is not permanent. That is, the glass sheet 52 would spring back to a planar, non-curved (i.e., flat) configuration if the glass sheet 52 was not adhered to mid-frame 63, which is connected to the rigid frame 64. Thus, the glass sheet 52 is stressed to produce the curvature and remains stressed during the life of the glass article 50.

FIG. 2B depicts another embodiment of a glass article 50, in particular a C-shaped glass article 50. As compared to the V-shaped glass article 50 of FIG. 2A, the C-shaped glass article 50 of FIG. 2B has a larger curved region 60 and shorter flat sections 62a, 62b. The V-shape and C-shape are but two examples of curved glass articles 50 that can be created according to the present disclosure. In other embodiments, the glass articles 50 can include curved regions 60 having opposing curvatures to create an S-shape, a curved region 60 followed by a flat section 62a to create a J-shape, and curved regions 60 separated by a flat section 62a to create a U-shape, among others.

Figure 3:
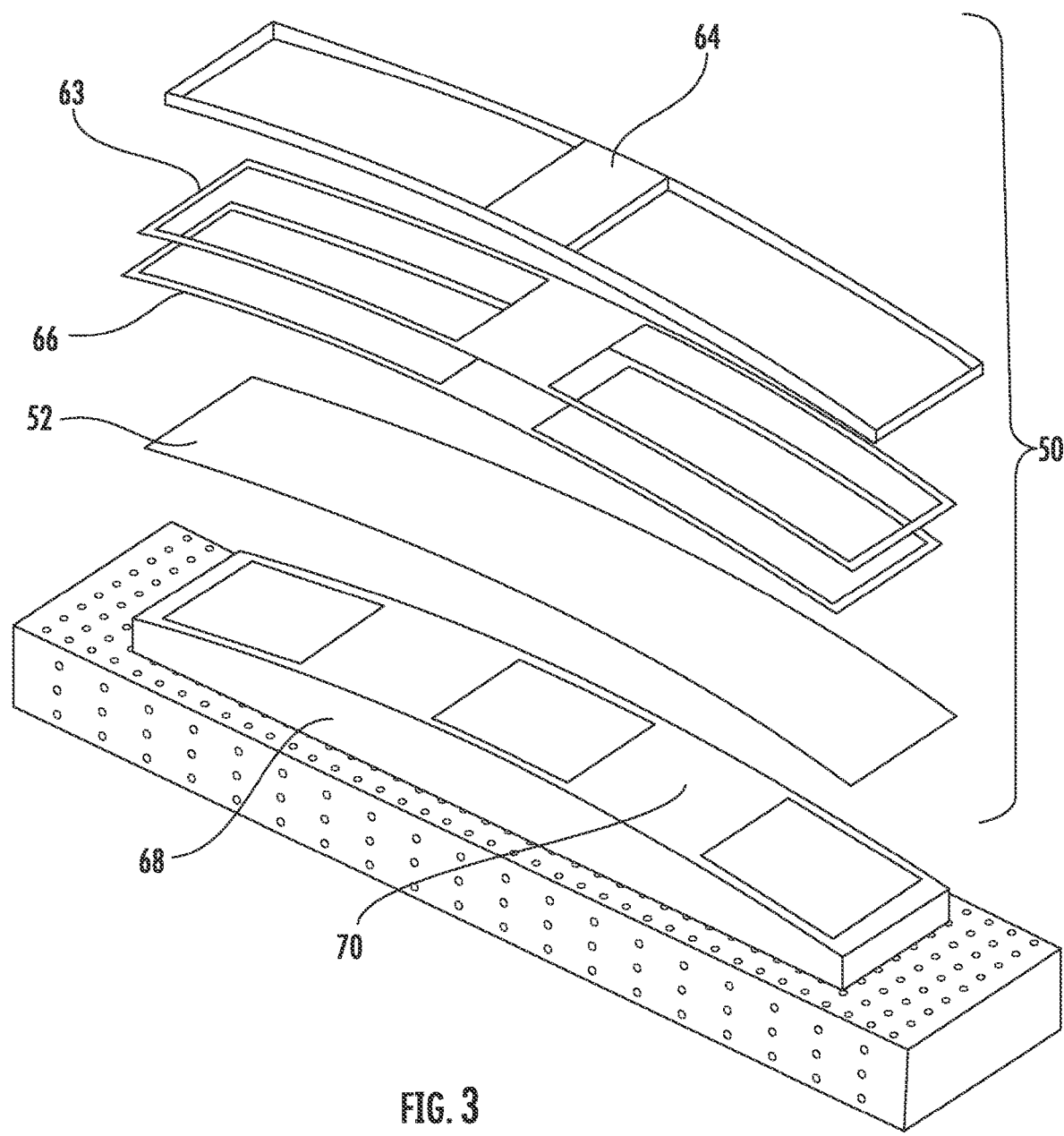
FIG. 3 depicts an exploded perspective view of a glass article and process chuck, according to an exemplary embodiment.

In embodiments, the glass articles 50 according to the present disclosure are formed by cold-forming techniques. In general, the process of cold-forming involves application of a bending force to the glass sheet 52 while the glass sheet 52 is situated on a chuck 68 as shown in the exploded view of FIG. 3. As can be seen, the chuck 68 has a curved forming surface 70, and the glass sheet 52 is bent into conformity with the curved forming surface 70. Advantageously, it is easier to apply surface treatments to a flat glass sheet 52 prior to creating the curvature in the glass sheet 52, and cold-forming allows the treated glass sheet 52 to be bent without destroying the surface treatment (as compared to the tendency of high temperatures associated with hot-forming techniques to destroy surface treatments, which requires surface treatments to be applied to the curved article in a more complicated process). In embodiments, the cold forming process is performed at a temperature less than the glass transition temperature of the glass sheet 52. In particular, the cold forming process may be performed at room temperature (e.g., about 20° C.) or a slightly elevated temperature, e.g., at 200° C. or less, 150° C. or less, 100° C. or less, or at 50° C. or less.

Figure 4:
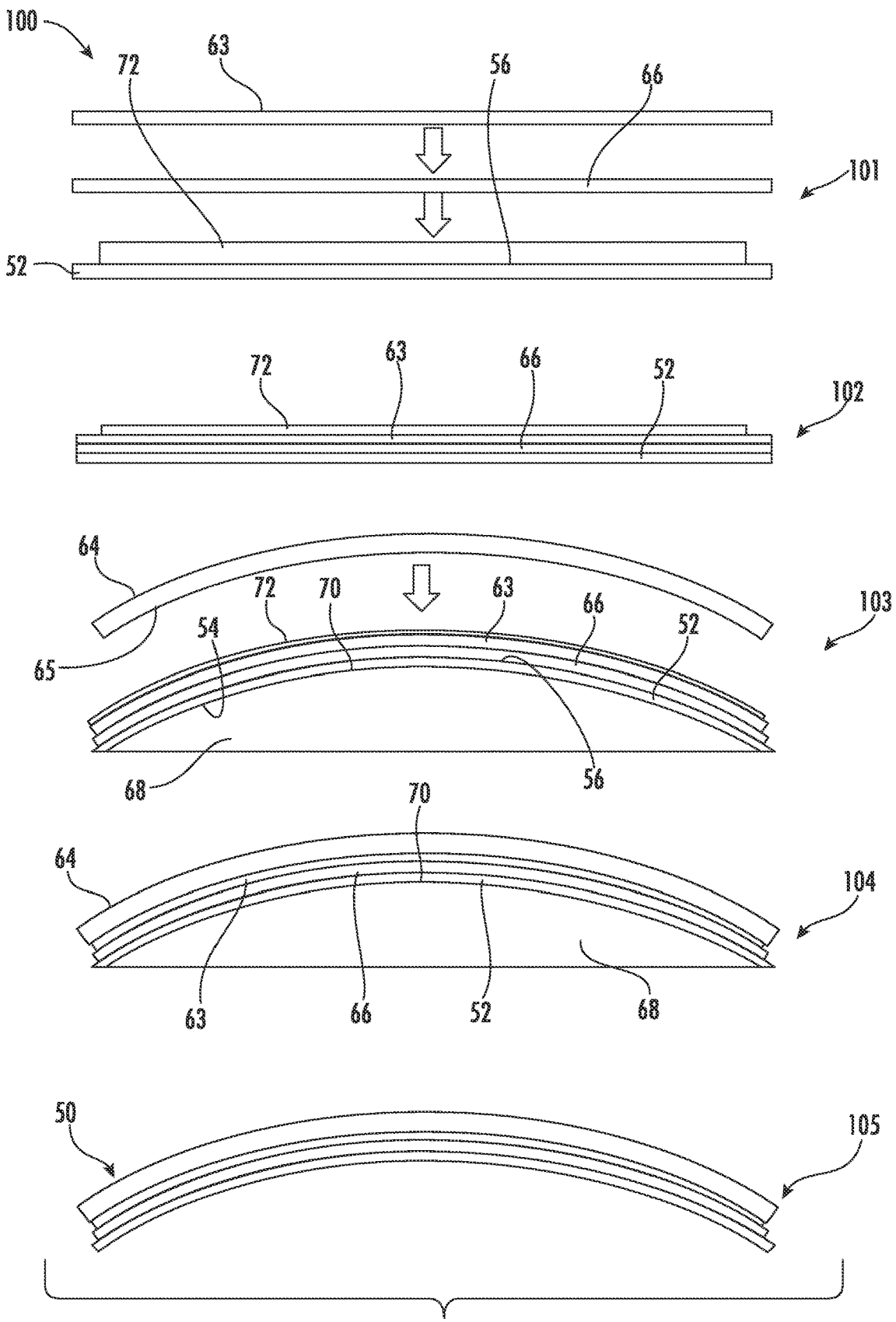
FIG. 4 depicts steps of a method of forming a curved glass article incorporating a mid-frame, according to an exemplary embodiment.

FIG. 4 depicts a process flow of a method 100 of forming a curved glass article 50. In a first step 101 of the method, a glass sheet 52 having a display module 72 mounted on the second major surface 56 is provided. In embodiments, the display module 72 may be, e.g., a light-emitting diode (LED) display, an organic LED (OLED) display, a micro-LED display, a liquid crystal display (LCD), or a plasma display. In embodiments, the display module 72 is mounted to the second major surface 56 of the glass sheet 52 using an optically clear adhesive (not shown). The adhesive layer 66 is applied to the second major surface 56 of the glass sheet 52 around the display module 72, and the mid-frame 63 is adhered to the glass sheet 52 using the adhesive layer 66.

In a second step 102, the adhesive layer 66 is allowed to cure on the glass sheet 52 to join the mid-frame 63 to the glass sheet 52. Advantageously, the display 72 and mid-frame 63 can be bonded to the glass sheet 52 while the glass sheet 52 is in the flat configuration prior to bending the glass sheet 52 over the chuck 68. As mentioned above, no specialized processing equipment (such as a chuck 68) is needed to this point in the method 100, and while curing, the glass sheet 52 and mid-frame 63 can be queued and densely packed. Moreover, minimal or no clamping force is required while curing the adhesive layer 66 in the flat configuration, and technologies that accelerate curing (application of even heat or electromagnetic radiation) are easier to apply to flat components.

In a third step 103, the glass sheet 52 having the display 72 and mid-frame 63 bonded thereto is cold-bent over the forming surface 70 of the chuck 68. In embodiments, cold-bending involves utilizing a press to apply a pressure to the glass sheet 52 so as to conform the glass sheet 52 to the curvature of the forming surface 70. In embodiments, the glass sheet 52 is held in the cold-bent position using vacuum pressure drawn through the chuck 68. When the glass sheet 52 is bent, the mid-frame 63 is also bent. Further, if the display 72 is provided across a curved region 60, then the display 72 is also bent with the glass sheet 52.

In a fourth step 104, the frame 64 is attached to the mid-frame 63 while the glass sheet 52 is in the cold-bent configuration on the chuck 68. As mentioned above and as will be discussed below, the mid-frame 63 may be mechanically connected to the frame 64. In this way, the mechanical connection between the frame 64 and the mid-frame 63, which has already been adhered to the glass sheet 52, holds the glass sheet 52 in the cold-bent configuration. Conventionally, a cold-bent glass article had a frame bonded directly to the glass sheet, which held the glass sheet in the cold-bent configuration. Constructing the glass article in this way required the adhesive bonding the frame to the glass sheet to cure before the glass article could be removed from the chuck. Curing of the adhesive could take up to two hours to complete, which creates a processing bottleneck in which the forming chuck cannot be used to cold-bend glass articles. Accordingly, by bonding the mid-frame 63 to the glass sheet 52 in the flat configuration and then bending the combined mid-frame 63 and glass sheet 52 over the chuck 68, the adhesive layer 66 does not have to cure while the glass article 50 is on the chuck 68. Instead, as shown in step 105, the glass article 50 can be removed from the chuck 68 upon securing the frame 64 to the mid-frame 63, freeing the chuck 68 to be used for another cold-bending operation.

In embodiments, the mid-frame 63 can also be adhered to the frame 64, and in such embodiments, the mechanical connection between the mid-frame 63 and frame 64 allows the adhesive between the mid-frame 63 and frame 64 to be cured off of the process chuck 68.

FIG. 5 depicts a first embodiment of a mid-frame 63 configuration for attachment to the frame 64. As shown in FIG. 5, the glass sheet 52 has been cold bent, and the mid-frame 63 is adhered to the second major surface 56 of the glass sheet 52 via adhesive layer 66. The mid-frame 63 is L-shaped including a first member 74 generally parallel to the second major surface 56 of the glass sheet 52 and a second member 76 arranged generally perpendicular to the first member 74. The first member 74 is adhered to the glass sheet 52. The second member 76 includes an aperture 78 through which a fastener 80 (e.g., pin, screw, bolt, etc.) may be inserted to secure the mid-frame 63 to the frame 64. In embodiments, the head of the fastener 80 is given a large diameter to lower local stress concentrations. In such embodiments, the head of the fastener 80 has a diameter of at least 2 mm, and in specific embodiments, the diameter depends on the applied local force and the number of fasteners 80 used. As shown in FIG. 5, the fastener 80 secures the mid-frame 63 to the exterior of the frame 64. In embodiments, the first member 74 extends around the entire perimeter of the frame 64. In embodiments, the second member 76 extends around the entire perimeter of the frame 64 and includes a plurality of apertures 78 through which fasteners 80 can be inserted to join the mid-frame 63 to the frame 64. In such embodiments, the second member 76 may provide a decorative feature to hide the frame 64. In other embodiments, the second member 76 only extends from the first member 74 at locations where an aperture 78 through which a fastener 80 is inserted to join the mid-frame 63 to the frame 64.

FIG. 6 depicts another embodiment of a mid-frame 63 configuration for attachment to the frame 64. As with the previous embodiment, the mid-frame 63 is L-shaped, having the first member 74 and the second member 76 arranged generally perpendicular to the first member 74. The first member 74 is still adhered to the second major surface 56 of the glass sheet 52 via the adhesive layer 66, but in the embodiment of FIG. 6, the second member 76 is arranged on the interior of the frame 64. The second member 76 includes the aperture 78, but the fastener 80 is inserted through the exterior of the frame 64 to secure the second member 76 to the interior of the frame 64. Advantageously, attaching the mid-frame 63 to the frame 64 in this manner can help prevent deformations of the mid-frame 63 (specifically an opening of the angle between the first member 74 and the second member 76) resulting from the residual stress of the glass sheet 52 in the cold-bent configuration, which tends to make the glass sheet 52 pull away from the frame 64 holding it in the cold-bent configuration. By arranging the mid-frame 63 on the interior of the frame 64, the mid-frame 63 is located where the stress pulling the glass sheet 52 away from the frame 64 is the highest.

In embodiments, the first member 74 extends around the entire perimeter of the frame 64. In embodiments, the second member 76 extends around the entire perimeter of the frame 64 (e.g., to provide a decorative feature) and includes a plurality of apertures 78 through which fasteners 80 can be inserted to join the mid-frame 63 to the frame 64. In other embodiments, the second member 76 only extends from the first member 74 at locations where an aperture 78 through which a fastener 80 is inserted to join the mid-frame 63 to the frame 64.

Figure 7:
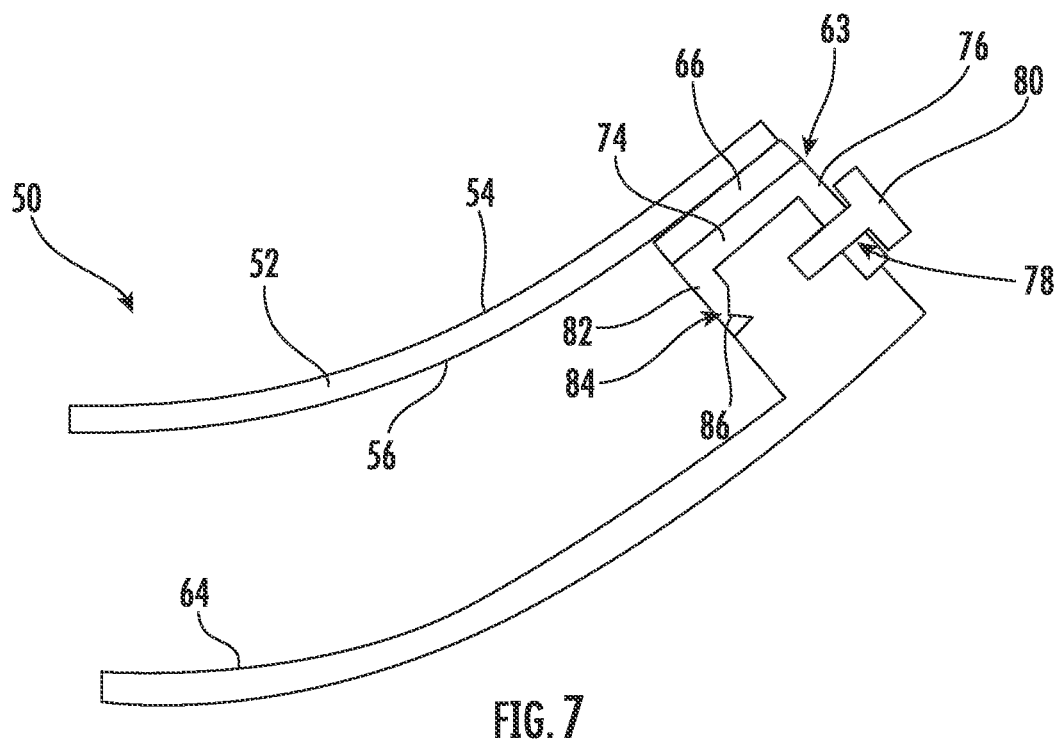

FIG. 7 depicts still another embodiment of a mid-frame 63 configuration for attachment to the frame 64. In this embodiment, the mid-frame 63 includes the first member 74 and the second member 76 extending substantially perpendicularly from the first member 74 at one end. At the other end of the first member 74 is a third member 82. The third member 82 extends substantially perpendicularly from the first member 74 in the same direction as the second member 76. The third member 82 mechanically engages the interior of the frame 64. In the embodiment depicted, the third member 82 mechanically engages the interior of the frame 64. For example, the third member 82 may include a slot 84 that engages a projection 86 extending from the interior surface of the frame 64, or vice versa. In the embodiment of FIG. 7, the second member 74 includes an aperture 78 through which the fastener 80 is inserted to join the mid-frame 63 to the frame 64. In this way, the mid-frame 63 is joined to both the interior and exterior of the frame 64 so as to prevent shape deformation from residual stresses of the glass and provide ease of attachment of the mid-frame 63 to the frame 64.

In embodiments, the first member 74 extends around the entire perimeter of the frame 64. In embodiments, the second member 76 extends around the entire perimeter of the frame 64 (e.g., to provide a decorative feature) and includes a plurality of apertures 78 through which fasteners 80 can be inserted to join the mid-frame 63 to the frame 64. In other embodiments, the second member 76 only extends from the first member 74 at locations where an aperture 78 through which a fastener 80 is inserted to join the mid-frame 63 to the frame 64. In embodiments, the third member 82 extends around the entire perimeter of the frame 64. In other embodiments, the third member 82 only periodically extends from the first member 74, e.g., at the same location as the second member 74 or in between locations of the second member 74.

Figure 8:
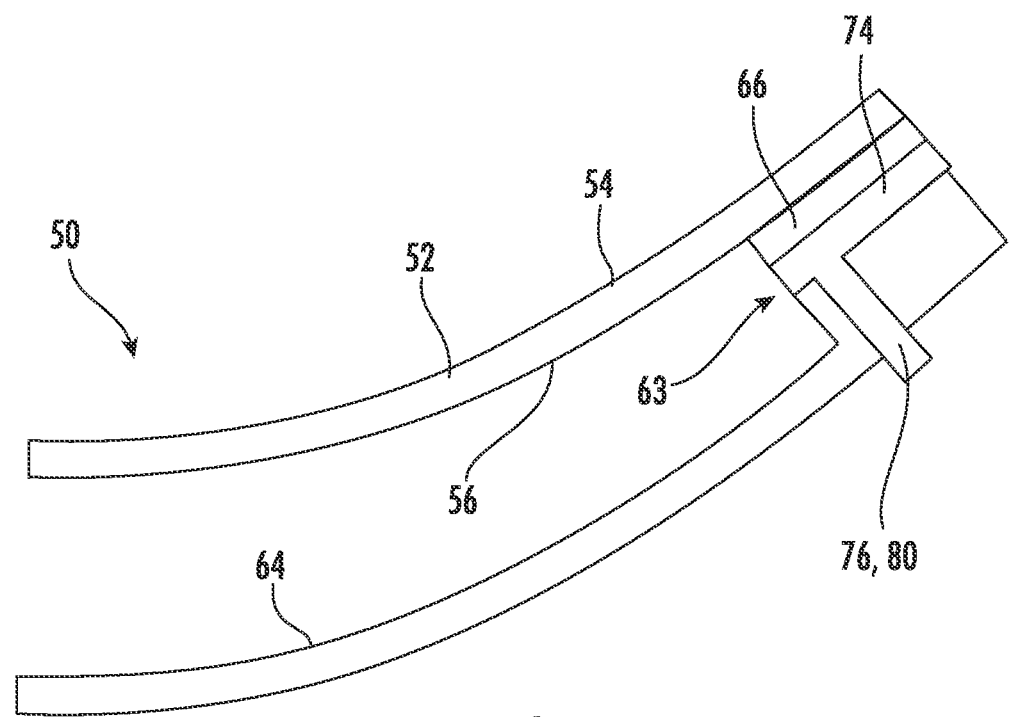

FIG. 8 depicts a further embodiment of a mid-frame 63 configuration for attachment to the frame 64. In this embodiment, the mid-frame 63 includes the first member 74 adhered to the second major surface 56 of the glass sheet 52. In an embodiment, the mid-frame 63 includes a second member 76 extending substantially perpendicularly from the first member 74 and through the frame 64. In such an embodiment, the second member 74 may be thermally joined to the frame 64 (such as by melting an end of the second member 74 to create a head that prevents the frame 64 from pulling away from the mid-frame 63). In another embodiment, instead of a second member 76, a fastener 80 is inserted through the frame 64 to join the mid-frame 63 to the frame 64. In still another embodiment, the mid-frame 63 can be attached to the frame 64 using a combination of second members 76 and fasteners 80. As can be seen, the second member 76 or fastener 80 is inserted through the frame 64 closer to the interior side of the frame 64 than to the exterior side, which addresses the potential for deformation of the glass article 50 resulting from the residual stresses of the glass sheet 52. In embodiments, the second members 76 and/or fasteners 80 periodically extend from the first member 74 in a regular or irregular pattern.

As discussed above, the mid-frame 63 is designed to be bonded to the glass sheet 52 when the glass sheet 52 is in the flat configuration and then be bent with the glass sheet 52 during a cold-bending operation. Thus, in embodiments, the mid-frame 63 comprises a lower flexural rigidity or stiffness (through material selection and/or design geometry) than the flexural rigidity or stiffness of the rigid frame 64. In particular, the mid-frame 63 must be able to bend under typical cold-forming forces, whereas the rigid frame 64 is specifically designed to withstand such forces to maintain the glass sheet 52 in the cold-formed shape.

Thus, for example, the mid-frame 63 may be made of a polymeric or composite material. In exemplary embodiments, the mid-frame 63 is made from at least one of polycarbonate (PC), acrylonitrile butadiene styrene (ABS), poly (methyl methacrylate) (PMMA), polyamide (PA), polypropylene (PP), polyurethane (PUR), polyvinylchloride (PVC), polystyrene (PS), polyethylene (PE), polyoxymethylene (POM), polybutylene terephthalate (PBT), polyethylene terephthalate (PET), acrylonitrile styrene acrylate (ASA), or a fiber-reinforced plastic, such as a PC with glass fiber.

In embodiments, the frame 64 is made from a metal, such as an aluminum alloy, a magnesium alloy, or a steel alloy, and the glass sheet 52 is made from a metal material, such as soda lime glass, aluminosilicate glass, borosilicate glass, boroaluminosilicate glass, alkali-containing aluminosilicate glass, alkali-containing borosilicate glass, and alkali-containing boroaluminosilicate glass.

Given the different materials from which the components of the glass article 50 are made, the components will experience different rates of thermal expansion during temperature cycling. The differential thermal expansions create thermal stresses that can, if not taken into consideration in the design, lead to failure of the glass article, particularly in the adhesive layer leading to delamination of the glass sheet from the mid-frame.

Figure 9:
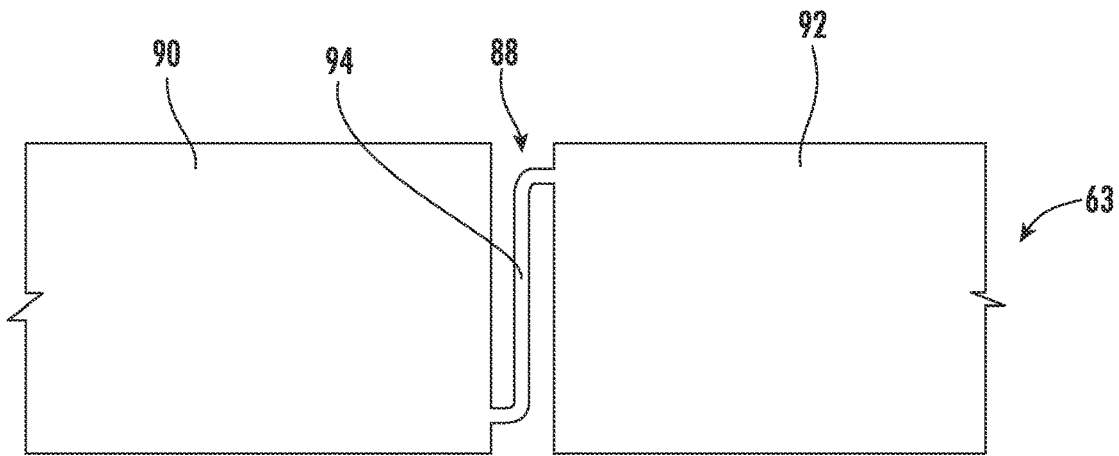
FIGS. 9-10 depict a gap between segments of a mid-frame for decreasing thermal stresses, according to an exemplary embodiment.
Figure 10:
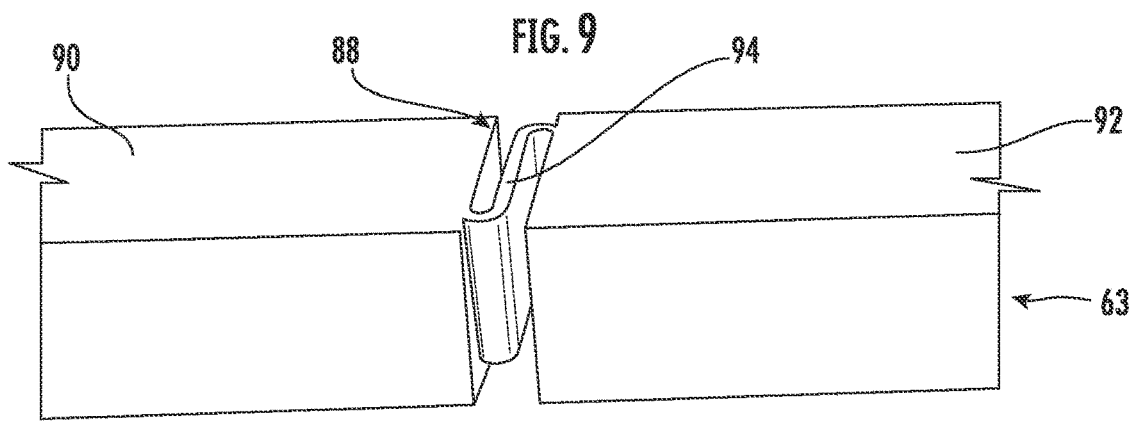

In an embodiment, the design of the glass article 50 addresses the differential in thermal expansion by incorporating a plurality of breaks in the mid-frame 63 as shown in FIGS. 9 and 10. As can be seen in the top view of FIG. 9, the mid-frame 63 includes a gap 88 between a first segment 90 and a second segment 92. The gap 88 allows the mid-frame 63 to expand and contract under thermal cycling to account for differences in thermal expansion and contraction between the frame 64 and glass sheet 52. As shown in FIG. 9, the first segment 90 and second segment 92 may be connected by a web 94 to facilitate handling of the mid-frame 63, i.e., so that segments 90, 92 do not become separated during assembly of the mid-frame 63 and of the glass article 50. As can be seen in FIG. 9, the connecting web 94 joins the first segment 90 and second segment 92 across the gap 88 but still allows expansion or contraction of the gap 88 during thermal cycling.

In that regard, in the perspective view shown in FIG. 10, the connecting web 94 may be flush with the surface of the segments 90, 92 adjacent to the frame 64, but the web 94 may not extend down to flush with the surface of the segments 90, 92 adjacent the glass sheet 52. The distance provided at the bottom of the connecting web 94 shown in FIG. 10 assures that the connecting web 94 is not bonded in place by the adhesive layer 66, thereby allowing the gap 88 to expand and contract freely during thermal cycling. In embodiments, the gap 88 between segments 90, 92 is 5 mm or less, in particular 2 mm or less, and most particularly about 1 mm. In embodiments, the mid-frame 63 may be formed through an injection molding process, and the webs 94 between segments 90, 92 can be formed from the mold design used in the injection molding process.

Figure 11:
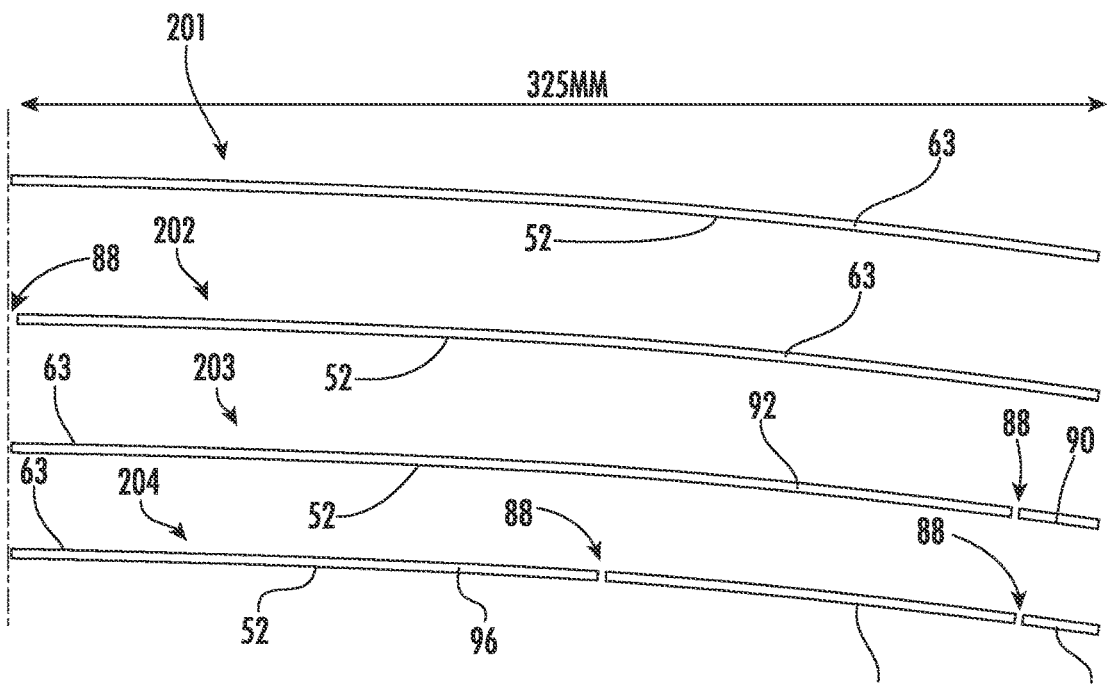
FIG. 11 depicts various locations for gaps between segments of the mid-frame, according to exemplary embodiments.

FIG. 11 depicts various embodiments of a mid-frame 63 having a half-length of 325 mm and including one without a gap and three having at least one gap 88 located at various positions along the mid-frame 63. The normalized principal (i.e., local tensile) and shear stresses in the adhesive layer 66 between the mid-frame 63 and glass sheet 52 is shown in Table 1 for each of the configurations.

In the first embodiment 201 shown in FIG. 11, the mid-frame 63 does not include any gaps. As shown in Table 1, the principal and shear stresses are the greatest in this embodiments, as denoted by the normalized stress of 1.0 for each. In the second embodiment 202 shown in FIG. 11, the mid-frame 63 includes a single gap 88 located at the midpoint of the mid-frame 63. As shown in Table 2, the principal and shear stresses both decrease as evidence from a normalized principal stress of 0.91 and a normalized shear stress of 0.94. In the third embodiment 203 shown in FIG. 11, the mid-frame 63 includes a single gap 88 located 25 mm from the end of the mid-frame 63 creating a first segment 90 and a second segment 92. As shown in Table 2, the normalized principal and shear stresses in the first segment 90 are 0.14 and 0.13, respectively. In the second segment 92, the normalized principal and shear stresses are each 0.94 and 0.94.

In the fourth embodiment 204 shown in FIG. 11, the mid-frame 63 includes two gaps 88. The first gap 88 is located 25 mm from the end of the mid-frame 63, thereby creating a first segment 90 and a second segment 94. The second gap 88 is located 125 mm from the first gap 88, creating a third segment 96. As shown in Table 1, the normalized principal and shear stresses in the first segment 90 are 0.11 and 0.13, respectively, and the normalized principal and shear stresses in the second segment 92 are 0.52 and 0.49, respectively. In the third segment 96, the normalized principal and shear stresses are 0.89 and 0.87, respectively.

TABLE 1

Comparison of Stress in Adhesive Layer based Gap/Gap Position in Mid-Frame

| Embodiment | Segment | Normalized Max. Principal Stress | Normalized Max. Shear Stress |
|---|---|---|---|
| 201 | — | 1.00 | 1.00 |
| 202 | — | 0.91 | 0.94 |
| 203 | 90 | 0.14 | 0.13 |
|  | 92 | 0.94 | 0.94 |
| 204 | 90 | 0.11 | 0.13 |
|  | 92 | 0.52 | 0.49 |
|  | 96 | 0.89 | 0.87 |

The embodiments 201-204 only consider a half of the mid-frame 63 and glass sheet 52, but the principal and shear stresses are expected to by symmetrical on each side. Thus, consideration of just one half provides sufficient information for the entire mid-frame 63. As can be seen from Table 2, including even a single gap 88 in the design of the mid-frame 63 decreases the maximum principal and shear stresses experienced by the adhesive layer 66 between the mid-frame 63 and glass sheet 52. In particular, dividing the mid-frame 63 into multiple, small segments would provide the greatest decrease in principal and shear stresses.

The mid-frame 63 as described herein provides several processing advantages when preparing a curved glass article 50. Besides alleviating the process bottleneck conventionally required to cure the adhesive joining the frame to the glass sheet, the mid-frame 63 also allows for easier management of connections to the display module when the display module is laminated to the glass sheet. Additionally, the frame 64 can easily be removed from the mid-frame 63 to provide rework access to the display module 72.

Figure 12:
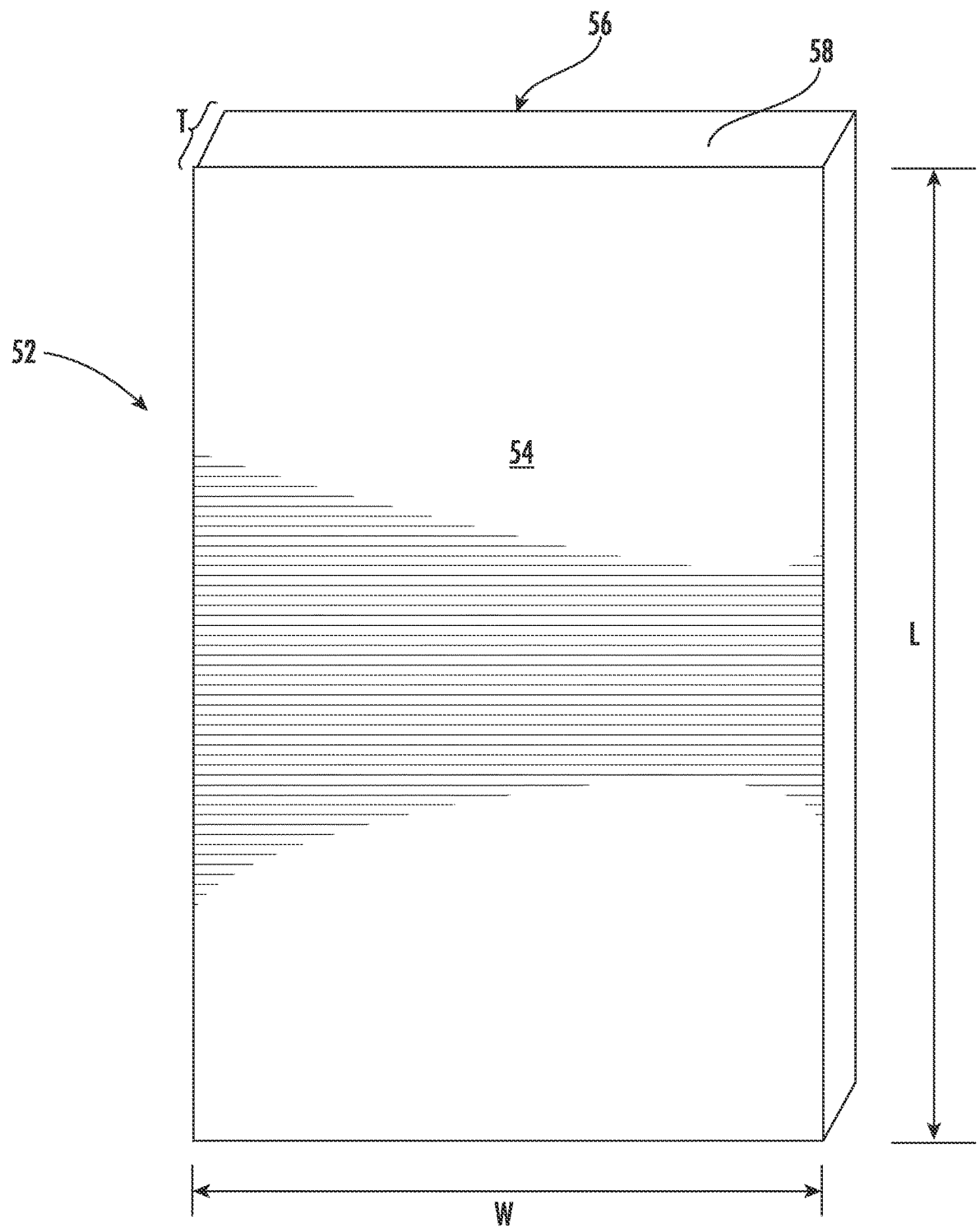
FIG. 12 depicts geometric dimensions of a glass sheet, according to an exemplary embodiment.

Referring to FIG. 12, additional structural details of glass sheet 52 are shown and described. As noted above, glass sheet 52 has a thickness T that is substantially constant and is defined as a distance between the first major surface 54 and the second major surface 56. In various embodiments, T may refer to an average thickness or a maximum thickness of the glass sheet. In addition, glass sheet 52 includes a width W defined as a first maximum dimension of one of the first or second major surfaces 54, 56 orthogonal to the thickness T, and a length L defined as a second maximum dimension of one of the first or second major surfaces 54, 56 orthogonal to both the thickness and the width. In other embodiments, W and L may be the average width and the average length of glass sheet 52, respectively.

In various embodiments, average or maximum thickness T is in the range of 0.3 mm to 2 mm. In various embodiments, width W is in a range from 5 cm to 250 cm, and length L is in a range from about 5 cm to about 1500 cm. As mentioned above, the radius of curvature (e.g., R as shown in FIGS. 2A and 2B) of glass sheet 52 is about 30 mm to about 1000 mm.

In embodiments, the glass sheet 52 may be strengthened. In one or more embodiments, glass sheet 52 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass sheet 52 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In various embodiments, glass sheet 52 may be chemically strengthened by ion exchange. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheet 52 may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass sheet. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. Central tension or CT is the maximum tensile stress and is measured by SCALP.

In one or more embodiments, the glass sheet may be strengthened to exhibit a DOC that is described as a fraction of the thickness T of the glass sheet (as described herein). For example, in one or more embodiments, the DOC may be in the range of about 0.05 T to about 0.25 T. In some instances, the DOC may be in the range of about 20 μm to about 300 μm. In one or more embodiments, the strengthened glass sheet 52 may have a CS (which may be found at the surface or a depth within the glass sheet) of about 200 MPa or greater, about 500 MPa or greater, or about 1050 MPa or greater. In one or more embodiments, the strengthened glass sheet may have a maximum tensile stress or central tension (CT) in the range of about 20 MPa to about 100 MPa.

Suitable glass compositions for use as glass sheet 52 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %. In one or more embodiments, the glass composition includes $Al_2O_3$ in an amount of about 3 mol % to about 15 mol %. In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass.

In one or more embodiments, the glass composition comprises $B_2O_3$ in an amount in the range of about 0.01 mol % to about 5 mol %. However, in one or more embodiments, the glass composition is substantially free of $B_2O_3$. As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ in an amount of about 0.01 mol % to 2 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is in a range from about 8 mol % to about 20 mol %. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount in a range from about from about 8 mol % to about 20 mol %. In one or more embodiments, the glass composition includes $K_2O$ in an amount in a range from about 0 mol % to about 4 mol %. In one or more embodiments, the glass composition may be substantially free of $K_2O$. In one or more embodiments, the glass composition is substantially free of $Li_2O$. In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In one or more embodiments, the glass composition includes CaO in an amount less than about 1 mol %. In one or more embodiments, the glass composition is substantially free of CaO. In some embodiments, the glass composition comprises MgO in an amount from about 0 mol % to about 7 mol %.

In one or more embodiments, the glass composition comprises $ZrO_2$ in an amount equal to or less than about 0.2 mol %. In one or more embodiments, the glass composition comprises $SnO_2$ in an amount equal to or less than about 0.2 mol %.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to 1 mol %. Where the glass composition includes $TiO_2$, $TiO_2$ may be present in an amount of about 5 mol % or less.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass sheet 52 may be made from any glass composition falling with any one of the exact numerical ranges discussed above.

Aspect (1) of this disclosure pertains to a method of forming a glass article, comprising: adhering a mid-frame to a glass sheet in a flat configuration, the glass sheet comprising a first major surface and a second major surface opposite to the first major surface, the mid-frame being adhered to the second major surface of the glass sheet; bending the glass sheet and the mid-frame over a forming surface of a chuck so that the glass sheet is in a curved configuration, the forming surface comprising a first radius of curvature of 20 mm or more and the first major surface of the glass sheet conforming to the forming surface; attaching a frame to the mid-frame, the frame holding the glass sheet in the curved configuration.

Aspect (2) of this disclosure pertains to the method of Aspect (1), further comprising adhering a display module to the second major surface of the glass sheet prior to bending.

Aspect (3) of this disclosure pertains to the method of Aspect (1) or Aspect (2), further comprising curing an adhesive adhering the mid-frame to the glass sheet prior to bending.

Aspect (4) of this disclosure pertains to the method of any one of Aspects (1) through (3), wherein the mid-frame comprises a first member adhered to the glass sheet and a second member extending from the first member and away from the glass sheet and wherein the method further comprises securing the second member to the frame.

Aspect (5) of this disclosure pertains to the method of Aspect (4), wherein the second member is secured to an exterior of the frame.

Aspect (6) of this disclosure pertains to the method of Aspect (5), wherein the mid-frame comprises a third member extending from the first member and away from the glass sheet, wherein the second member and the third member are on opposite ends of the first member, and wherein the third member is configured to mechanically engage an interior of the frame.

Aspect (7) of this disclosure pertains to the method of Aspect (6), wherein the third member and the interior of the frame define an interlocking groove and protrusion.

Aspect (8) of this disclosure pertains to the method of Aspect (4), wherein the second member is secured to an interior of the frame.

Aspect (9) of this disclosure pertains to the method of any one of Aspects (4) through (8), wherein attaching further comprises securing the second member to the frame using a fastener inserted through the exterior of the frame.

Aspect (10) of this disclosure pertains to the method of Aspect (4), wherein the second member extends through the frame between an interior surface and an exterior surface of the frame.

Aspect (11) of this disclosure pertains to the method of Aspect (10), wherein the second member is positioned closer to the interior surface than to the exterior surface.

Aspect (12) of this disclosure pertains to the method of Aspect (10) or Aspect (11), wherein the second member is a fastener.

Aspect (13) of this disclosure pertains to the method of Aspect (10) or Aspect (11), wherein the second member is part of a unitary construction with the first member and wherein the second member is thermally joined to the frame.

Aspect (14) of this disclosure pertains to the method of any one of Aspects (1) through Aspect (13), wherein the mid-frame comprises at least one of polycarbonate, acrylonitrile butadiene styrene, poly(methyl methacrylate), polyamide, polypropylene, polyurethane, polyvinylchloride, polystyrene, polyethylene, polyoxymethylene, polybutylene terephthalate, polyethylene terephthalate, acrylonitrile styrene acrylate, or a fiber-reinforced plastic.

Aspect (15) of this disclosure pertains to the method of any one of Aspects (1) through Aspect (14), wherein the mid-frame comprises at least one gap dividing the mid-frame into at least two segments.

Aspect (16) of this disclosure pertains to the method of Aspect (15), wherein each of the at least one gap divides the segments by 5 mm or less.

Aspect (17) of this disclosure pertains to the method of Aspect (15) or Aspect (16), wherein a connecting web is provided across the gap between respective segments.

Aspect (18) of this disclosure pertains to the method of any one of Aspects (1) through Aspect (17), wherein the mid-frame comprises a first stiffness, wherein the frame comprises a second stiffness, and wherein the second stiffness is greater than the first stiffness.

Aspect (19) of this disclosure pertains to a curved glass article, comprising: a glass sheet comprising a first major surface and a second major surface opposite to the first major surface; a mid-frame adhered to the second major surface of the glass sheet, the mid-frame comprising a first stiffness; and a frame mechanically attached to the mid-frame, the frame comprising a frame support surface defining a curvature having a radius of curvature of 20 mm or more and the frame comprising a second stiffness; wherein the frame holds the glass sheet in a curved configuration; and wherein the second stiffness is greater than the first stiffness.

Aspect (20) of this disclosure pertains to the curved glass article of Aspect (19), further comprising a display module adhered to the second major surface of the glass sheet.

Aspect (21) of this disclosure pertains to the curved glass article of Aspect (19) or Aspect (20), wherein the mid-frame comprises a first member adhered to the glass sheet and a second member extending from the first member and away from the glass sheet and wherein the second member is mechanically attached to the frame.

Aspect (22) of this disclosure pertains to the curved glass article of Aspect (21), wherein the second member is mechanically attached to an exterior of the frame.

Aspect (23) of this disclosure pertains to the curved glass article of Aspect (22), wherein the mid-frame comprises a third member extending from the first member and away from the glass sheet, wherein the second member and the third member are on opposite ends of the first member, and wherein the third member is configured to mechanically engage an interior of the frame.

Aspect (24) of this disclosure pertains to the curved glass article of Aspect (23), wherein the third member and the interior of the frame define an interlocking groove and protrusion.

Aspect (25) of this disclosure pertains to the curved glass article of Aspect (21), wherein the second member is mechanically attached to the interior of the frame.

Aspect (26) of this disclosure pertains to the curved glass article of any one of Aspects (21) through (25), wherein the second member is mechanically attached to the frame using a fastener inserted through the exterior of the frame.

Aspect (27) of this disclosure pertains to the curved glass article of Aspect (21), wherein the second member extends through the frame between an interior surface and an exterior surface of the frame.

Aspect (28) of this disclosure pertains to the curved glass article of Aspect (27), wherein the second member is positioned closer to the interior surface than to the exterior surface.

Aspect (29) of this disclosure pertains to the curved glass article of Aspect (27) or Aspect (28), wherein the second member is a fastener.

Aspect (30) of this disclosure pertains to the curved glass article of Aspect (27) or Aspect (28), wherein the second member is part of a unitary construction with the first member and wherein the second member is thermally joined to the frame.

Aspect (31) of this disclosure pertains to the curved glass article of any one of Aspects (19) through (30), wherein the mid-frame comprises at least one of polycarbonate, acrylonitrile butadiene styrene, poly(methyl methacrylate), polyamide, polypropylene, polyurethane, polyvinylchloride, polystyrene, polyethylene, polyoxymethylene, polybutylene terephthalate, polyethylene terephthalate, acrylonitrile styrene acrylate, or a fiber-reinforced plastic.

Aspect (32) of this disclosure pertains to the curved glass article of any one of Aspects (19) through (31), wherein the mid-frame comprises at least one gap dividing the mid-frame into at least two segments.

Aspect (33) of this disclosure pertains to the curved glass article of Aspect (32), wherein each of the at least one gap divides the segments by 5 mm or less.

Aspect (34) of this disclosure pertains to the curved glass article of Aspect (32) or Aspect (33), wherein a connecting web is provided across the gap between respective segments.

Aspect (35) of this disclosure pertains to the curved glass article of any one of Aspects (19) through (34), wherein the glass sheet comprises a maximum thickness between the first major surface and the second major surface of 0.3 mm to 2.0 mm.

Aspect (36) of this disclosure pertains to a vehicle interior system comprising the curved glass article according to any of Aspects (19) through (35).

Aspect (37) of this disclosure pertains to a vehicle comprising the vehicle interior system of Aspect (36).

Aspect (38) of this disclosure pertains to the vehicle of Aspect (37), wherein the vehicle comprises an automobile, a seacraft, or an aircraft.

Aspect (39) of this disclosure pertains to a mid-frame of a curved glass article, the curved glass article comprising a glass sheet and a frame, the mid-frame comprising: a first member configured to be adhered to the glass sheet and a second member extending from the first member, the second member configured for mechanical attachment to the frame.

Aspect (40) of this disclosure pertains to the mid-frame of Aspect (39), wherein the second member is configured for mechanically attachment to an exterior of the frame.

Aspect (41) of this disclosure pertains to the mid-frame of Aspect (40), wherein the mid-frame comprises a third member extending from the first member in the same direction as the second member, wherein the second member and the third member are on opposite ends of the first member, and wherein the third member is configured for mechanically engagement to an interior of the frame.

Aspect (42) of this disclosure pertains to the mid-frame of Aspect (41), wherein the third member is configured to form an interlocking groove and protrusion with the interior of the frame.

Aspect (43) of this disclosure pertains to the mid-frame of Aspect (39), wherein the second member is configured for mechanical attachment to the interior of the frame.

Aspect (44) of this disclosure pertains to the mid-frame of any one of Aspects (39) through (43), wherein the second member is configured for mechanical attachment to the frame using a fastener inserted through the exterior of the frame.

Aspect (45) of this disclosure pertains to the mid-frame of Aspect (39), wherein the second member is configured to extend through the frame between an interior surface and an exterior surface of the frame.

Aspect (46) of this disclosure pertains to the mid-frame of Aspect (45), wherein the second member extends from the first member at a position configured to be closer to the interior surface than to the exterior surface.

Aspect (47) of this disclosure pertains to the mid-frame of Aspect (45) or Aspect (46), wherein the second member is a fastener.

Aspect (48) of this disclosure pertains to the mid-frame of Aspect (45) or Aspect (46), wherein the second member is part of a unitary construction with the first member and wherein the second member is configured to be thermally joined to the frame.

Aspect (49) of this disclosure pertains to the mid-frame of any one of Aspects (39) through (48), wherein the mid-frame comprises at least one of polycarbonate, acrylonitrile butadiene styrene, poly(methyl methacrylate), polyamide, polypropylene, polyurethane, polyvinylchloride, polystyrene, polyethylene, polyoxymethylene, polybutylene terephthalate, polyethylene terephthalate, acrylonitrile styrene acrylate, or a fiber-reinforced plastic.

Aspect (50) of this disclosure pertains to the mid-frame of any one of Aspects (39) through (49), wherein the mid-frame comprises at least one gap dividing the mid-frame into at least two segments.

Aspect (51) of this disclosure pertains to the mid-frame of Aspect (50), wherein each of the at least one gap divides the segments by 5 mm or less.

Aspect (52) of this disclosure pertains to the mid-frame of Aspect (50) or Aspect (51), wherein a connecting web is provided across the gap between respective segments.

Aspect (53) of this disclosure pertains to a glass article comprising a glass sheet, a frame, and a mid-frame according to any of Aspects (39) through (52), wherein the mid-frame is adhered to the glass sheet and mechanically attached to the frame.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of forming a glass article, comprising:
    adhering a mid-frame to a glass sheet in a flat configuration, the glass sheet comprising a first major surface and a second major surface opposite to the first major surface, the mid-frame being adhered to the second major surface of the glass sheet;
   bending the glass sheet and the mid-frame over a forming surface of a chuck so that the glass sheet is in a curved configuration, the forming surface comprising a first radius of curvature of 20 mm or more and the first major surface of the glass sheet conforming to the forming surface;
    attaching a frame to the mid-frame, the frame holding the glass sheet in the curved configuration.

2. The method of claim 1, wherein the mid-frame comprises a first member adhered to the glass sheet and a second member extending from the first member and away from the glass sheet and wherein the method further comprises securing the second member to the frame.

3. The method of claim 1, wherein the mid-frame comprises a first stiffness, wherein the frame comprises a second stiffness, and wherein the second stiffness is greater than the first stiffness.

4. A curved glass article, comprising:
    a glass sheet comprising a first major surface and a second major surface opposite to the first major surface;
        a mid-frame adhered to the second major surface of the glass sheet, the mid-frame comprising a first stiffness; and
        a frame mechanically attached to the mid-frame, the frame comprising a frame support surface defining a curvature having a radius of curvature of 20 mm or more and the frame comprising a second stiffness;
        wherein the frame holds the glass sheet in a curved configuration; and
    wherein the second stiffness is greater than the first stiffness.

5. The curved glass article of claim 4, further comprising a display module adhered to the second major surface of the glass sheet.

6. The curved glass article of claim 4, wherein the mid-frame comprises a first member adhered to the glass sheet and a second member extending from the first member and away from the glass sheet and wherein the second member is mechanically attached to the frame.

7. The curved glass article of claim 6, wherein the second member is mechanically attached to an exterior of the frame.

8. The curved glass article of claim 7, wherein the mid-frame comprises a third member extending from the first member and away from the glass sheet, wherein the second member and the third member are on opposite ends of the first member, and wherein the third member is configured to mechanically engage an interior of the frame.

9. The curved glass article of claim 8, wherein the third member and the interior of the frame define an interlocking groove and protrusion.

10. The curved glass article of claim 6, wherein the second member is mechanically attached to the interior of the frame.

11. The curved glass article according to claim 6, wherein the second member is mechanically attached to the frame using a fastener inserted through the exterior of the frame.

12. The curved glass article of claim 6, wherein the second member extends through the frame between an interior surface and an exterior surface of the frame.

13. The curved glass article of claim 12, wherein the second member is positioned closer to the interior surface than to the exterior surface.

14. The curved glass article of claim 12, wherein the second member is a fastener.

15. The curved glass article of claim 12, wherein the second member is part of a unitary construction with the first member and wherein the second member is thermally joined to the frame.

16. The curved glass article according to claim 4, wherein the mid-frame comprises at least one of polycarbonate, acrylonitrile butadiene styrene, poly(methyl methacrylate), polyamide, polypropylene, polyurethane, polyvinylchloride, polystyrene, polyethylene, polyoxymethylene, polybutylene terephthalate, polyethylene terephthalate, acrylonitrile styrene acrylate, or a fiber-reinforced plastic.

17. The curved glass article according to claim 4, wherein the mid-frame comprises at least one gap dividing the mid-frame into at least two segments.

18. The curved glass article according to claim 17, wherein each of the at least one gap divides the segments by 5 mm or less.

19. The curved glass article of claim 17, wherein a connecting web is provided across the gap between respective segments.

20. The curved glass article of claim 4, wherein the glass sheet comprises a maximum thickness between the first major surface and the second major surface of 0.3 mm to 2.0 mm.

* * * * *